United States Patent
Jia et al.

(10) Patent No.: US 8,861,355 B2
(45) Date of Patent: Oct. 14, 2014

(54) MULTICAST RATE CONTROL

(71) Applicant: QUALCOMM Incorporated, San Diego, CA (US)

(72) Inventors: Zhanfeng Jia, Belmont, CA (US); Shu Du, Milpitas, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 13/677,251

(22) Filed: Nov. 14, 2012

(65) Prior Publication Data

US 2014/0133303 A1    May 15, 2014

(51) Int. Cl.
| | |
|---|---|
| *H04L 1/00* | (2006.01) |
| *H04W 28/02* | (2009.01) |
| *H04L 12/18* | (2006.01) |
| *H04W 4/06* | (2009.01) |
| *H04L 1/16* | (2006.01) |

(52) U.S. Cl.
CPC ......... *H04W 28/0236* (2013.01); *H04L 12/189* (2013.01); *H04W 4/06* (2013.01); *H04L 1/0002* (2013.01); *H04L 2001/0093* (2013.01); *H04L 1/1685* (2013.01); *H04L 1/0033* (2013.01); *H04L 1/0019* (2013.01); *H04L 1/0027* (2013.01)
USPC ......... 370/232; 370/230; 370/235; 370/230.1

(58) Field of Classification Search
USPC ...................... 370/229, 230, 230.1, 236, 232
See application file for complete search history.

(56) References Cited

U.S. PATENT DOCUMENTS

| | | | |
|---|---|---|---|
| 2005/0129058 A1 | 6/2005 | Casaccia et al. | |
| 2008/0045228 A1 | 2/2008 | Zhang et al. | |
| 2009/0276674 A1* | 11/2009 | Wei et al. | 714/749 |
| 2009/0323541 A1 | 12/2009 | Sagfors et al. | |

(Continued)

FOREIGN PATENT DOCUMENTS

| | | |
|---|---|---|
| WO | 2004042988 A1 | 5/2004 |
| WO | 2005036917 A1 | 4/2005 |
| WO | 2010103353 A2 | 9/2010 |

OTHER PUBLICATIONS

International Search Report and Written Opinion—PCT/US2013/065992—ISA/EPO—Dec. 13, 2013.

*Primary Examiner* — Andrew Lai
*Assistant Examiner* — Jamaal Henson
(74) *Attorney, Agent, or Firm* — Bever, Hoffman & Harms, LLP (57) ABSTRACT

A method of providing multicast rate control in a wireless communication device can include transmitting data frames to a plurality of stations in a multicast group with a first data rate. Acknowledgements (ACKs) can then be requested from a first subset of the plurality of stations. Frame losses can be determined using the ACKs from the first subset. A second data rate can be determined based on the frame losses with the first subset. A second subset of the plurality of stations can be selected based on the frame losses with the first subset. Data frames can be transmitted to the plurality of stations with the second data rate. Notably, ACKs only from the second subset of the plurality of stations are requested. Frame losses for the second subset can be determined using those ACKs. A current data rate can be adjusted based on the frame losses for the subset and at least one predetermined threshold. Data frames can be transmitted to the plurality of stations using the adjusted data rate.

73 Claims, 5 Drawing Sheets

(56) References Cited

U.S. PATENT DOCUMENTS

| | | |
|---|---|---|
| 2010/0046453 A1 | 2/2010 | Jones, IV et al. |
| 2010/0110905 A1 | 5/2010 | An et al. |
| 2011/0211468 A1* | 9/2011 | Zhang et al. ............ 370/252 |
| 2012/0026991 A1 | 2/2012 | Niu et al. |
| 2012/0140648 A1* | 6/2012 | Bejerano et al. ............ 370/252 |
| 2012/0213099 A1 | 8/2012 | Cheng et al. |
| 2013/0051388 A1* | 2/2013 | Pantelidou et al. ........... 370/390 |

\* cited by examiner

MULTICAST RATE CONTROL

BACKGROUND OF THE DISCLOSURE

The disclosure is related to multicast transmissions in a wireless communication network and in particular to rate control for these transmissions.

RELATED ART

Conventionally, data packets in a wireless communication network have been sent to a single destination. This transmission of data to a single destination is referred to as "unicast". In a unicast network, providing the same data to multiple destinations would entail copying the data and then sending each copy to a designated destination. Due to bandwidth and network constraints, using unicast to transmit data to multiple destinations quickly becomes untenable as the number of destinations increases.

To address this problem, "multicast" data transmission was developed. Multicast transmission is the simultaneous delivery of data to a plurality of designated destinations via a single transmission. Note that, in contrast, a "broadcast" refers to a transmission of data packets to all destinations (e.g., within a given basic service set (BSS), served by a given service provider, etc.). Multicast transmission can reduce traffic and server loads by simultaneously delivering a single stream of data to many destinations. Therefore, multicast transmission is preferred over unicast transmission for applications such as teleconferencing, music sharing, and gaming, all of which entail delivering information to many users.

SUMMARY

A method of providing multicast rate control in a wireless communication device is described. This method can include transmitting data frames to a plurality of stations in a multicast group with a first data rate. In one embodiment, the first data rate is a lowest data rate. In another embodiment, the first data rate is a low, but not a lowest data rate.

After transmitting the data frames, acknowledgements (ACKs) can be requested from a first subset of the plurality of stations. In one embodiment, the first subset of the plurality of stations can include all of the plurality of stations. In another embodiment, the first subset of the plurality of stations can include a random subset of the plurality of stations. In yet another embodiment, the first subset of the plurality of stations can include stations with past low receive signal strength indicators (RSSIs). In yet another embodiment, the first subset of the plurality of stations can be selected based on past sounding feedback.

Frame losses (e.g., packet error rates (PERs)) for the first subset of the plurality of stations can be determined using the ACKs. A second data rate can be determined based on the frame losses for the first subset of the plurality of stations. A second subset of the plurality of stations can be selected based on the frame losses for the first subset of the plurality of stations. In one embodiment, selecting the second subset of the plurality of stations can include identifying stations with the highest frame losses. In another embodiment, selecting the second subset of the plurality of stations can include selecting at least two stations with the highest frame losses. In yet another embodiment, selecting the second subset of the plurality of stations can include selecting a predetermined percentage of the plurality of stations with the highest frame losses. In yet another embodiment, selecting the second subset of the plurality of stations can include randomly adding at least one station to the first subset of the plurality of stations.

A second data rate can be determined based on the frame losses with the first subset of the plurality of stations. In one embodiment, determining the second data rate can further includes comparing at least one of the frame losses for the first subset of the plurality of stations to a predetermined threshold. Data frames can be transmitted to the plurality of stations with the second data rate. Notably, the method requests ACKs only from the second subset of the plurality of stations.

The method can further include determining the frame losses for the second subset of the plurality of stations using the ACKs from the second subset of the plurality of stations. A current data rate can be adjusted based on the frame losses for the second subset of the plurality of stations. In one embodiment, adjusting the current data rate can include comparing at least one frame loss of the frame losses for the second subset of the plurality of stations to at least one predetermined threshold (e.g. frame losses higher than a first threshold and/or lower than a second threshold). Data frames can be transmitted to the plurality of stations using the adjusted data rate.

The method can further include determining whether a time period has expired after transmitting the data frames to the plurality of stations using the adjusted data rate. When the time period has expired, the method can return to the step of transmitting data frames to the plurality of stations in the multicast group with the first data rate. When the time period has not expired, the method can return to requesting ACKs only from the second subset of the plurality of stations.

Another method of providing multicast rate control in a wireless communication device is also described. This method can include performing a sounding with a first subset of a plurality of stations in a multicast group. In one embodiment, the first subset of the plurality of stations includes all of the plurality of stations. In another embodiment, the first subset of the plurality of stations includes a random subset of the plurality of stations. In yet another embodiment, the first subset of the plurality of stations includes stations with past low received signal strength indicators (RSSIs). In yet another embodiment, the first subset of the plurality of stations is selected based on past sounding feedback.

Feedback can be received from the first subset of the plurality of stations based on the sounding. This feedback can include channel state information. A second subset of the plurality of stations can be selected based on the feedback. In one embodiment, selecting the second subset of the plurality of stations can include randomly adding at least one station to the first subset of the plurality of stations. Data frames can be transmitted to the plurality of stations with a first data rate. This first data rate can be determined based on the feedback of the first subset of the plurality of stations.

Notably, acknowledgements (ACKs) are requested from only the second subset of the plurality of stations. Frame losses (e.g., packet error rates (PERs)) can be determined with the second subset of the plurality of stations. An adjusted data rate can be determined based on the frame losses with the second subset of the plurality of stations. Data frames can then be transmitted to the plurality of stations with the adjusted data rate.

Requesting ACKS from only the second subset of stations, determining frame losses with the second subset of stations, determining an adjusted data rate based on those frame losses, and transmitting data to the plurality of stations using the adjusted data rate can be repeated until a trigger is detected. In one embodiment, detecting the trigger can include detecting that a period of time has expired. In another embodiment, detecting the trigger includes detecting that the frame losses of one or more stations are increasing. When the trigger is detected, the method can return to performing the sounding.

A non-transitory, computer-readable medium storing computer-executable instructions for providing multicast rate control in a wireless communication device is also described. These computer-executable instructions, when executed by a processor, cause the processor to execute a process including one of the improved methods described herein.

An electronic device including a processor block and a communication block is also described. The communication block, which is in operative relation to the processor block, is configured to provide multicast rate control in the electronic device. The communication block can be configured to perform a process including one of the improved methods described herein.

DETAILED DESCRIPTION OF THE DRAWINGS

Figure 1:
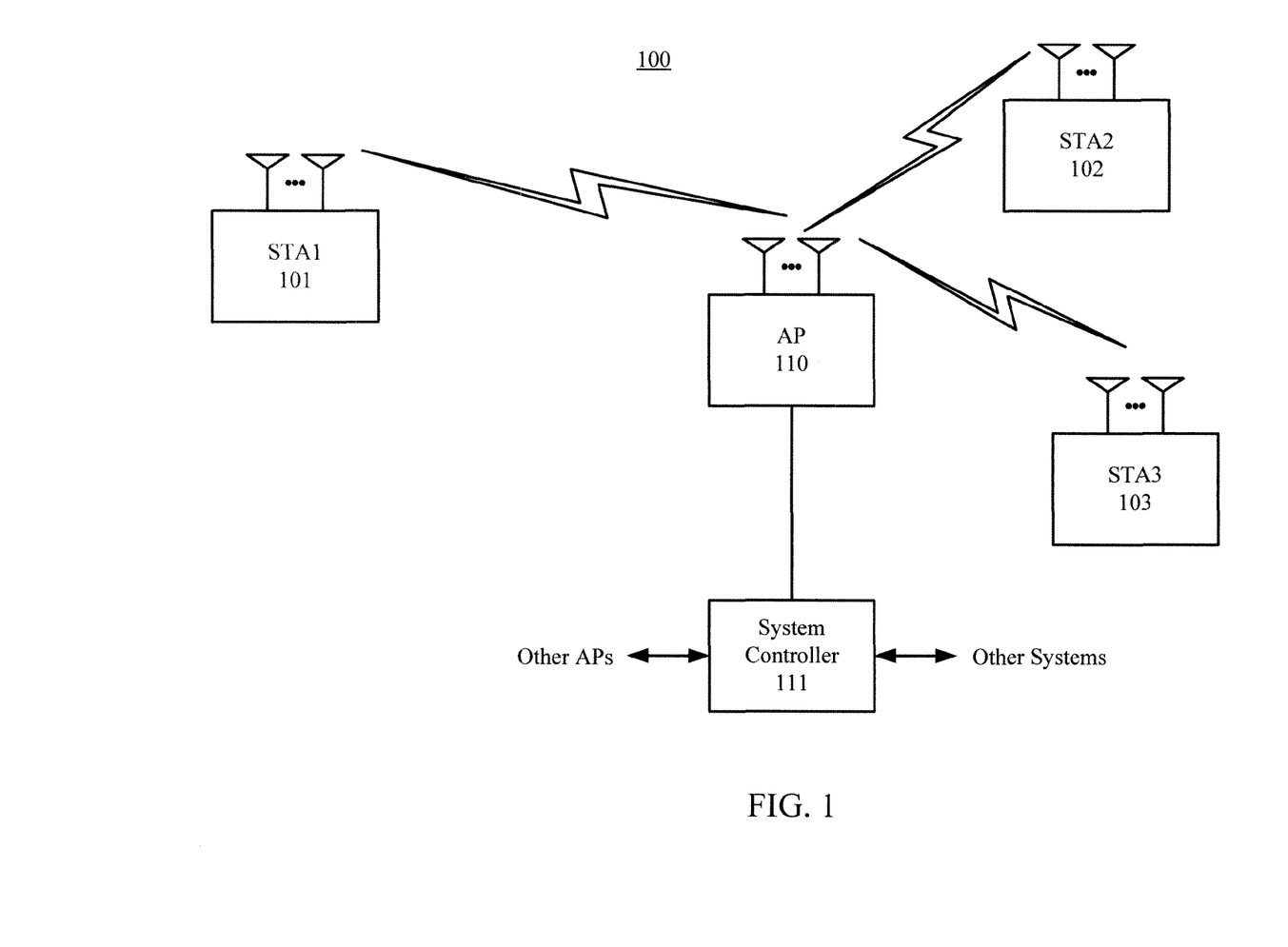
FIG. 1 illustrates an exemplary wireless communication system.

FIG. 1 illustrates an exemplary wireless communication system 100 in which multicast transmission can be performed. In this embodiment, wireless communication system 100 includes an access point (AP) 110 that can wirelessly communicate with a plurality of stations STA1 101, STA2 102, and STA3 103. A system controller 111 can be coupled to AP 110 to provide communication capability with other APs and/or other systems. Stations 101-103 can be wireless devices, such as cell phones, personal digital assistants (PDAs), handheld devices, laptop computers, and/or tablet computers.

Any application using a wireless transmission, including unicast or multicast transmission, tries to achieve two objectives: provide reliability and optimize rate control. For reliability, data frames are monitored to determine whether they are successfully delivered to the destination. Usually, reliability is measured by the packet error rate (PER), which is the number of incorrectly received data packets at a destination divided by the total number of data packets transmitted by a transmitter to the destination.

Although a maximum data rate is generally desired, a possible data rate for a transmission is limited by the number of spatial streams used in the transmission, the modulation type, and the coding rate. The number of spatial streams, modulation type, coding rate, and resulting maximum data rates form part of a modulation and code scheme (MCS). The IEEE 802.11 family of standards defines various modulation and coding schemes, and represents them by index values. Table 1 below (taken from IEEE 802.11n) shows exemplary MCS index values and their respective spatial streams, modulation types, coding rates, and resulting maximum data rates.

TABLE 1

| | | | | Data rate (Mbit/s) | | | |
| | | | | 20 MHz channel | | 40 MHz channel | |
| MCS | Spatial streams | Modulation type | Coding rate | 800 ns GI | 400 ns GI | 800 ns GI | 400 ns GI |
| --- | --- | --- | --- | --- | --- | --- | --- |
| 0 | 1 | BPSK | 1/2 | 6.50 | 7.20 | 13.50 | 15.00 |
| 10 | 2 | QPSK | 3/4 | 39.00 | 43.30 | 81.00 | 90.00 |
| 19 | 3 | 16-QAM | 1/2 | 78.00 | 86.70 | 162.00 | 180.00 |
| 31 | 4 | 64-QAM | 5/6 | 260.00 | 288.80 | 540.00 | 600.00 |

The transmitter attempts to determine the best MCS to send the data frames. Using a higher MCS may cause some receivers to fail to decode the data frames, thereby increasing the PER. However, using a lower MCS may cause inefficiency in medium usage and network congestion. Therefore, choosing a proper MCS for data frame transmissions is a tradeoff between reliability and efficiency.

In the unicast case, reliability and rate control are determined through acknowledgement frames (ACKs). In particular, if the transmitter fails to receive an ACK frame after transmitting a data frame, then the transmitter assumes that the data frame was lost or mistaken, and retransmits the data frame. With ACKs and retransmission, the transmitter can guarantee reliable data delivery. At the same time, the transmitter can use frame loss rate statistics to adaptively change MCS, thereby achieving rate control.

Figure 2:
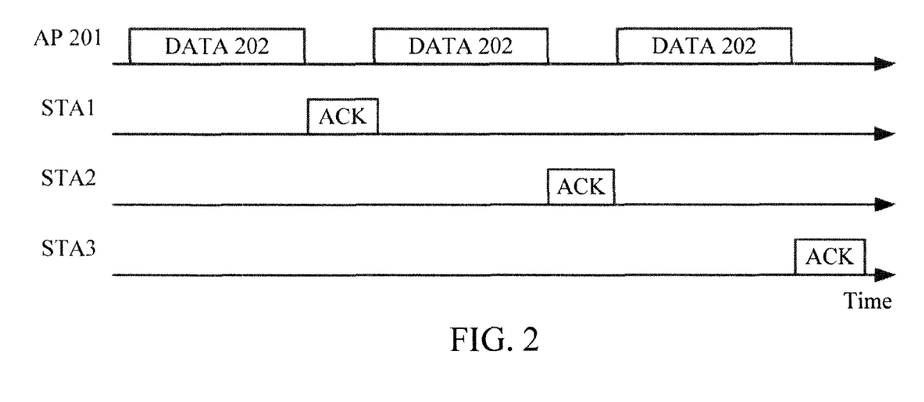
FIG. 2 illustrates one method in which an access point transmits the same data frame to each of three stations in a multicast group.

One way of extending the above-described ACK method to a multicast transmission is to repeatedly use a plurality of unicast transmissions, each unicast transmission targeting one receiver of the multicast group. FIG. 2 illustrates this method in which an AP 201 transmits the same data frame DATA 202 to each of three stations in a multicast group, i.e. STA1, STA2, and STA3. After receipt of data frame DATA 202, each station sends an ACK to AP 201. Using this method, the multicast data frames can reach the stations STA1, STA2, and STA3 reliably because AP 201 can choose the best MCS for transmission to a specific station.

However, this method is seldom adopted because of its overhead. Moreover, this method undoes the advantage of using multicast transmission, which is to transmit the data frame just once while supporting all receivers in a multicast group.

Therefore, three methods are commonly used to provide reliability in multicast transmissions. The first method is to select the lowest possible MCS (e.g. index number 0 in Table 1) for the transmission, thereby enabling reception even at the receiver with the worst reception (e.g. the receiver that is farthest away from the AP). Unfortunately, if all receivers are close by, then using the lowest MCS unnecessarily reduces efficiency.

The second method is to select a mid-range MCS (e.g., such as index number 8) and retransmit the data frame a few times (each time simultaneously to all receivers in the multicast group). These retransmissions can reduce the PER, thereby achieving the desired reliability, but once again with the penalty of reduced efficiency.

The third method is ACK polling. For example, the 802.11n standard provides a scheme for requesting an ACK for multiple frames. Specifically, instead of requesting an ACK from a station for each frame, multiple frames can be acknowledged together by having the station send a block acknowledgement (BA). Each BA contains a bit map, wherein each bit represents the success or failure of a specific frame.

Figure 3:
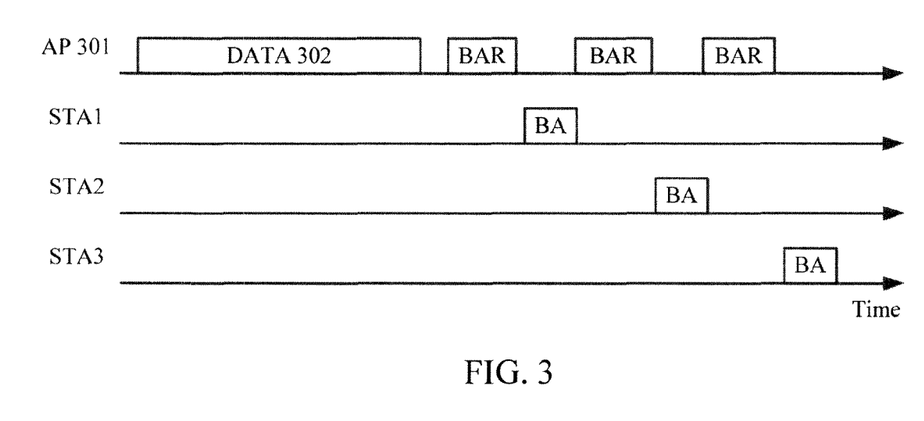
FIG. 3 illustrates an exemplary polling for block acknowledgements.

FIG. 3 illustrates an exemplary ACK polling for BAs. In this case, when an AP 301 transmits data frames DATA 302 to stations STA1, STA2, and STA3 in a multicast transmission, AP 301 also sends a BA request (BAR) frame to each station, which requests a BA frame from that STA. However, when the number of stations in a multicast group increases significantly, even BA responses from the stations become an undesirable drain on bandwidth and system resources. Also, when the number of stations in a multicast group increases, a station has to store the BA information for a longer time for the AP node to poll BAR on it.

Notably, the reliability requirement is generally different for multicast applications than for unicast applications. For example, a multicast application such as audio streaming can usually sustain a higher PER than a unicast application such as web browsing. Indeed, most multicast applications can achieve their PER requirements without retransmissions, provided that the data rate is set properly. Therefore, in accordance with one improved method for multicast rate control, the data rate is adjusted based on feedback from only a few of the stations in the multicast group.

Figure 4:
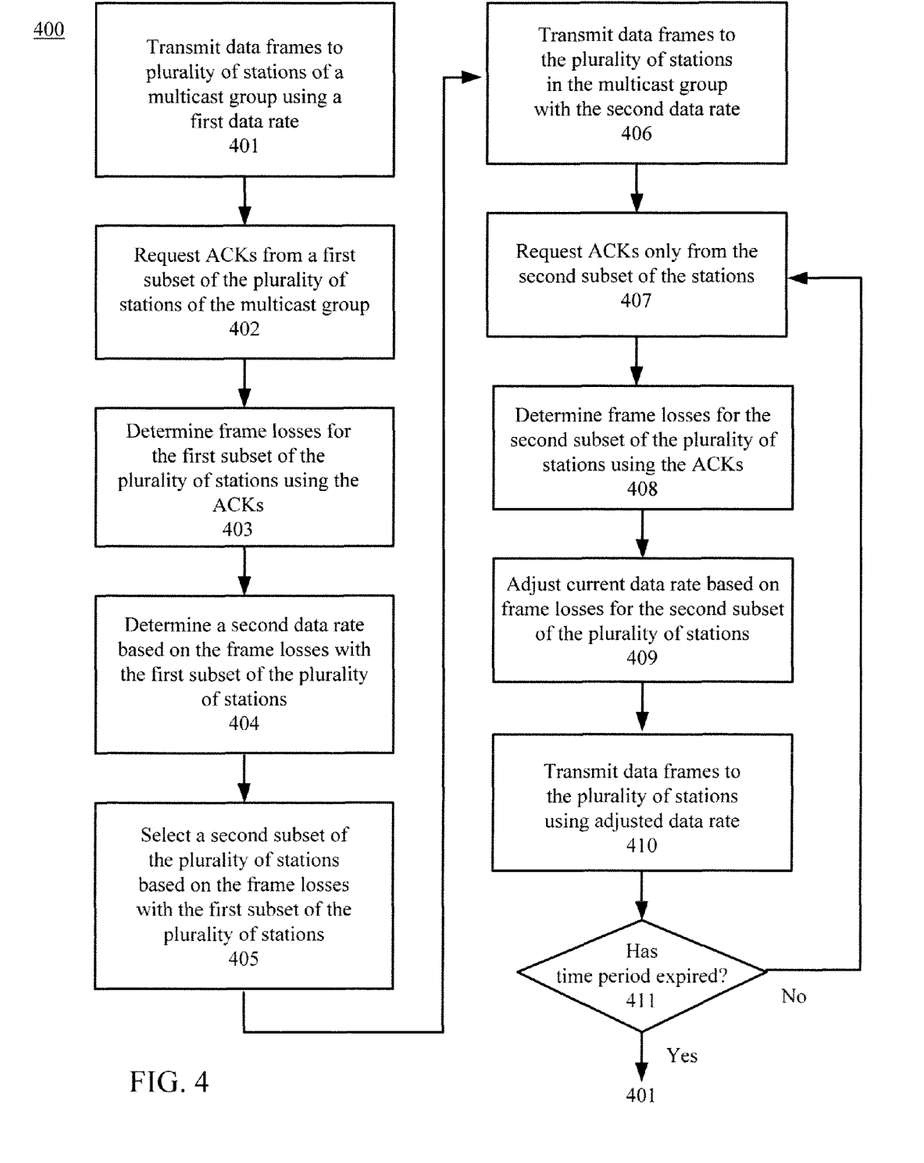
FIG. 4 illustrates an exemplary method of providing multicast rate control in a wireless communication device.

FIG. 4 illustrates an exemplary method 400 of providing multicast rate control in a wireless communication device. In step 401, the data frames can be transmitted to a plurality of stations of a multicast group using a first data rate. In one embodiment, the first data rate can be a lowest data rate. In another preferred embodiment, the first data rate is a low data rate, but other than the lowest data rate, thereby leveraging the observation that multicast applications can usually sustain a relatively high PER. For example, one exemplary first data rate range could be MCS index numbers 2-4. Step 402 can request ACK frames from a first subset of the plurality of stations of the multicast group. In one embodiment, the first subset of the plurality of stations can include all of the plurality of stations. In another embodiment, the first subset of the plurality of stations can include a random subset of the plurality of stations. In yet another embodiment, the first subset of the plurality of stations can include stations with past low received signal strength indications (RSSIs). In yet another embodiment, the first subset of the plurality of stations can include stations selected based on feedback from past sounding feedback. Step 403 can determine the frame losses, e.g. the PER, for the first subset of the plurality of stations using the received ACK frames.

Step 404 can determine a second data rate based on the frame losses with the first subset of the plurality of stations. In one embodiment, determining the second data rate can also be based on a predetermined threshold. For example, if any frame loss is greater than the predetermined threshold, then the second data rate can be set to one MCS index value less than the first data rate. On the other hand, is any frame loss is less than the predetermined threshold, then the second data rate can be set to one MCS index value greater than the first data rate. In one embodiment, the average of the frame losses can be compared to the predetermined threshold to determine the second data rate.

Step 405 can select a second subset of the plurality of stations based on the frame losses with the first subset of the plurality of stations. The second subset of the plurality of stations can be selected based on the highest frame losses experienced by the first subset of the plurality of stations. In one embodiment, the second subset is at least two stations, thereby ensuring that just one station does not control rate selection. In another embodiment, no more than a predetermined percentage of the plurality of stations is selected. The second subset of stations can also be specifically chosen (e.g., the N number of stations having the highest frame losses of the first subset of the plurality of stations, wherein N is an integer greater than 2) or arbitrarily chosen (e.g., of the stations having frame losses in the top 25%, arbitrarily selecting N or another predetermined percentage of those stations as the second subset).

Step 406 can transmit data frames to the plurality of stations in the multicast group with the second data rate. Notably, in step 407, ACK frames are requested only from the second subset of the plurality of stations. Frame losses for the second subset of the plurality of stations can be determined using these ACK frames in step 408. Step 409 can adjust the current data rate based on the frame losses from the second subset of the plurality of stations. In one embodiment, adjusting the current data rate can include using at least one threshold. For example, in one embodiment, when any frame loss is above a first threshold, then the current data rate can be reduced (e.g. by one MCS index value). In contrast, when any frame loss is below a second threshold, then the current data rate can be increased (e.g. by one MCS index value). In yet another embodiment, the current data rate can be adjusted using both the first and second thresholds. In one embodiment, the average of the frame losses can be compared to the first and/or second thresholds. Step 410 can transmit the data frames to the plurality of stations using the adjusted data rate. Step 411 can determine whether a predetermined time period has expired. If not, then the method returns to step 407. If the time period has expired, the method returns to transmitting data frames to a plurality of stations of a multicast group using a first data rate in step 401. In accordance with method 400, retransmission need not be performed, even if some of the stations of the multicast group fail to send back ACK frames.

Figure 5:
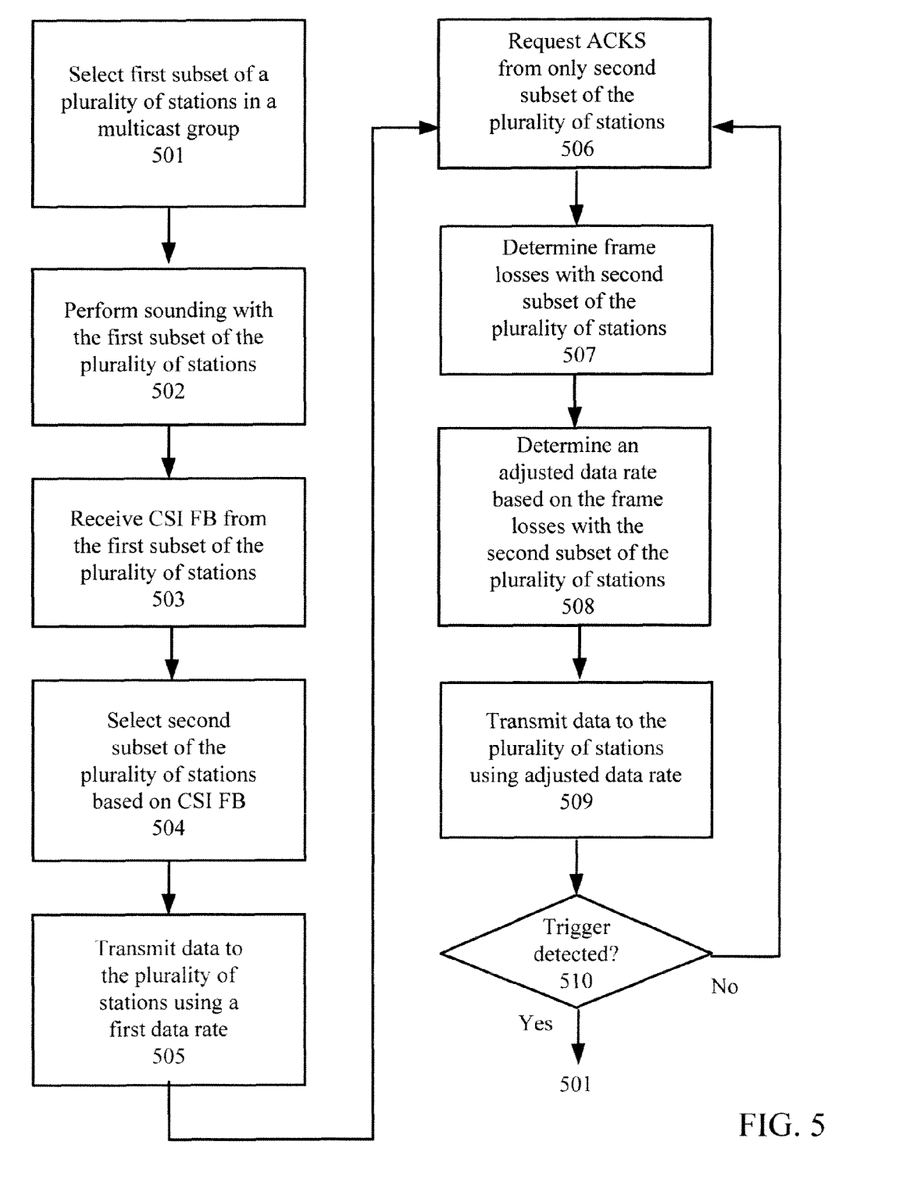
FIG. 5 illustrates another exemplary method of providing multicast rate control in a wireless communication device.

FIG. 5 illustrates another exemplary method 500 of providing multicast rate control in a wireless communication device. This method includes selecting a first subset of a plurality of stations in a multicast group in step 501. In one embodiment, the first subset of the plurality of stations can include all of the plurality of stations. In another embodiment, the first subset of the plurality of stations can include a random subset of the plurality of stations. In yet another embodiment, the first subset of the plurality of stations can include stations with past low received signal strength indications (RSSIs). In yet another embodiment, the first subset of the plurality of stations can include stations selected based on feedback from past sounding feedback.

Step 502 can perform a sounding with the first subset of the plurality of stations. In accordance with 802.11n, a sounding request frame is sent by a beamformer (transmitter), and a beamformee (receiver) will return channel state information in a sounding response frame to the beamformer. Using sounding frames, the beamformer and beamformee educate each other about the characteristics of the channel. This process is called a sounding.

Step 503 receives channel state information (CSI) feedback (FB) from the first subset of the plurality of stations based on the sounding. The channel state information describes channel properties of a communication link, such as scattering, fading, and power decay. In one embodiment, the channel state information can include instantaneous and/or statistical channel state information. Instantaneous channel state information refers to the current channel conditions, whereas statistical channel state information refers to a statistical characterization of the channel. In one embodiment, the channel state information can include instantaneous channel state information with some error qualification as well as statistical channel state information.

Step 504 can select a second subset of the plurality of stations based on the channel state information feedback from the first subset of stations. In one embodiment, selecting the second subset of the plurality of stations can include randomly adding at least one station to the first subset of the plurality of stations.

Step 505 can transmit data to the plurality of stations using a first data rate. In one embodiment, the first data rate can be based on the channel state information feedback from the first subset of the plurality of stations.

Notably, step 506 can request ACKs from only the second subset of the plurality of stations. Step 507 can determine frame losses (e.g., PERs) with the second subset of the plurality of stations. Step 508 can determine an adjusted data rate based on the frame losses with the second subset of the plurality of stations. Step 509 can transmit data frames to the plurality of stations with the adjusted data rate. In one embodiment, steps 506-509 can be repeated until a trigger is detected in step 510.

In one embodiment, detecting the trigger can include detecting that a period of time has expired. In another embodiment, detecting the trigger can include detecting that the frame losses of one or more stations are increasing. When a trigger is detected, method 500 returns to step 501 to select a first subset of the plurality of stations and then perform a sounding with the first subset of the plurality of stations (step 502). Thereafter, steps 503-510 can be performed as described above.

In one embodiment, one or more of the rate control methods 400 and 500 shown and described in reference to FIGS. 4 and 5, respectively, can be implemented in an AP (see, e.g. the AP of FIG. 1). Certain aspects of the rate control methods 400 and 500 described in FIGS. 4 and 5, respectively, may take the form of an entirely software embodiment (including firmware, resident software, micro-code, etc.) or an embodiment combining software and hardware aspects that may all generally be referred to herein as a "circuit," "module" or "system." Furthermore, embodiments of the disclosure may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette), optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions (e.g., executable by one or more processing units). In addition, machine-readable signal medium embodiments may be embodied in an electrical, optical, acoustical, or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Although the rate control methods can be performed by an AP, an electronic device having wireless capability typically includes certain components that may or may not be characterized as part of an AP. Indeed, in some embodiments, certain components of the electronic device may be characterized as outside the AP, but still assist in one or more steps of the data scheduling technique.

Figure 6:
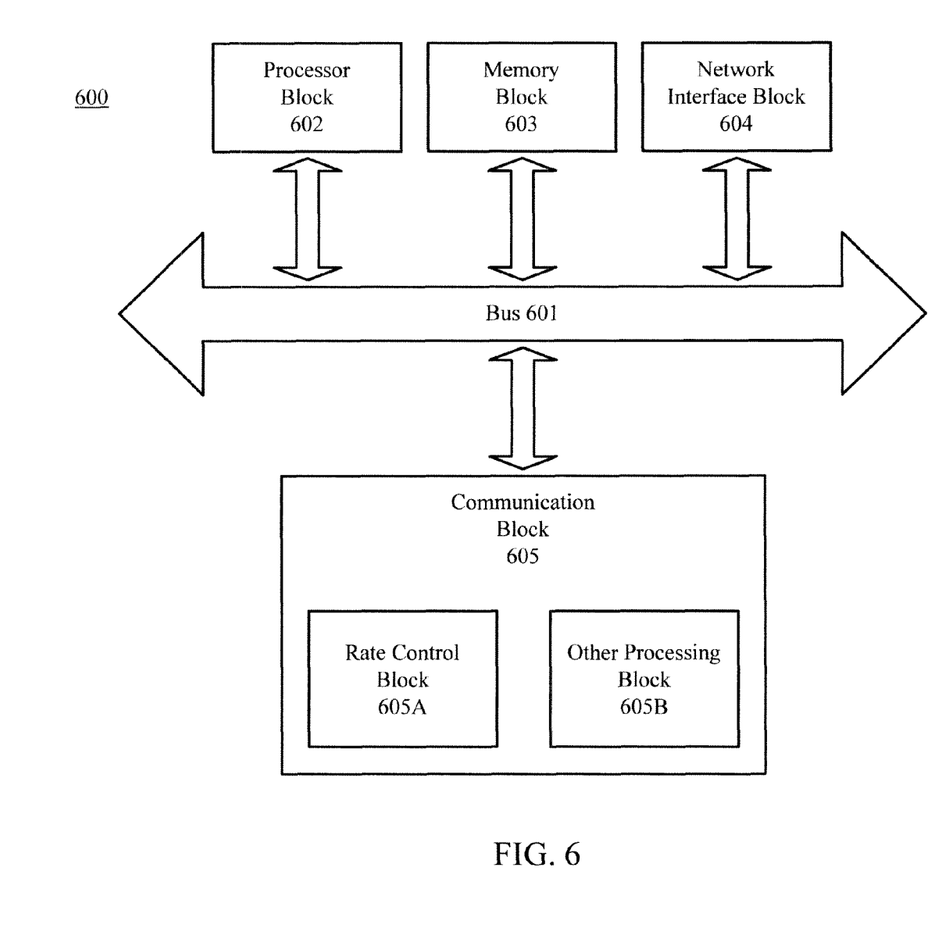
FIG. 6 illustrates a simplified electronic device including a rate control block.

FIG. 6 illustrates a simplified electronic device 600 including a rate control block 605A, which can substantially perform at least one of the multicast rate control techniques 400 and 500. The electronic device 600 may be a notebook computer, a desktop computer, a tablet computer, a netbook, a mobile phone, a gaming console, a personal digital assistant (PDA), or other electronic system having wireless (and wired, in some cases) communication capabilities.

The electronic device 600 can include a processor block 602 (possibly including multiple processors, multiple cores, multiple nodes, and/or implementing multi-threading, etc.). The electronic device 600 can also include a memory block 603, which may include cache, SRAM, DRAM, zero capacitor RAM, Twin Transistor RAM, eDRAM, EDO RAM, DDR RAM, EEPROM, NRAM, RRAM, SONOS, PRAM, and/or another type of memory cell array. The electronic device 600 also includes a network interface block 604, which may include at least a WLAN 802.11 interface. Other network interfaces may include a Bluetooth interface, a WiMAX interface, a ZigBee® interface, a Wireless USB interface, and/or a wired network interface (such as an Ethernet interface, or a powerline communication interface, etc.). The processor block 602, the memory block 603, and the network interface block 604 are coupled to a bus 601, which may be implemented in accordance with PCI, ISA, PCI-Express, Hyper-Transport®, InfiniBand®, NuBus, AHB, AXI, or another bus standard.

The electronic device 600 also includes a communication block 605, which can include a rate control block 605A and another processing block 605B. The other processing block 605B may include, but is not limited to, portions of a transceiver for processing received signals, for processing to be transmitted signals, and for coordinating actions of the receiver and transmitter portions. Other embodiments may include fewer or additional components not illustrated in FIG. 6, such as video cards, audio cards, additional network interfaces, and/or peripheral devices. In one embodiment, the memory block 603 may be connected directly to the processor block 602 to increase system processing.

The above description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, although selecting a data rate is described in detail above, this selection can be characterized as also selecting an MCS (modulation and coding scheme)

(see TABLE I). Thus, the present invention is not intended to be limited to the embodiments shown herein but is to be accorded the widest scope consistent with the principles and novel features disclosed herein.

The invention claimed is:

1. A method of providing multicast rate control in a wireless communication device, the method comprising:
   transmitting data frames to a plurality of stations in a multicast group with a first data rate;
   requesting acknowledgements (ACKs) from a first subset of the plurality of stations;
   determining frame losses for the first subset of the plurality of stations using the ACKs;
   determining a second data rate based on the frame losses for the first subset of the plurality of stations;
   selecting a second subset of the plurality of stations based on the frame losses for the first subset of the plurality of stations;
   transmitting data frames to the plurality of stations with the second data rate; and
   requesting ACKs only from the second subset of the plurality of stations.

2. The method of claim 1, further including selecting the first subset of the plurality of stations by selecting all of the plurality of stations.

3. The method of claim 1, further including selecting the first subset of the plurality of stations by selecting a random subset of the plurality of stations.

4. The method of claim 1, further including selecting the first subset of the plurality of stations by selecting stations with past low signal strength (RSSI).

5. The method of claim 1, further including selecting the first subset of the plurality of stations by selecting stations based on past sounding feedback.

6. The method of claim 1, wherein determining the second data rate further includes comparing at least one of the frame losses for the first subset of the plurality of stations to a predetermined threshold.

7. The method of claim 1, further including:
   determining frame losses for the second subset of the plurality of stations using the ACKs from the second subset of the plurality of stations;
   adjusting a current data rate based on the frame losses for the second subset of the plurality of stations, the adjusting generating an adjusted data rate; and
   transmitting data frames to the plurality of stations using the adjusted data rate.

8. The method of claim 7, wherein the adjusting includes comparing at least one of the frame losses for the second subset of the plurality of stations to a predetermined threshold.

9. The method of claim 7, further including determining whether a time period has expired after transmitting the data frames to the plurality of stations using the adjusted data rate.

10. The method of claim 9, further including:
    returning to transmitting data frames to the plurality of stations in the multicast group with the first data rate when the time period has expired; and
    returning to requesting ACKs only from the second subset of the plurality of stations when the time period has not expired.

11. The method of claim 1, wherein the first data rate is a lowest data rate.

12. The method of claim 1, wherein the first data rate is a low, but not a lowest data rate.

13. The method of claim 1, wherein determining the frame losses for the first subset of the plurality of stations includes determining packet error rates (PERs).

14. The method of claim 1, wherein selecting the second subset of the plurality of stations includes identifying stations with highest frame losses.

15. The method of claim 1, wherein selecting the second subset of the plurality of stations includes selecting at least two stations with highest frame losses.

16. The method of claim 1, wherein selecting the second subset of the plurality of stations includes selecting a predetermined percentage of the plurality of stations with highest frame losses.

17. The method of claim 1, wherein selecting the second subset of the plurality of stations includes randomly adding at least one station to the first subset of the plurality of stations.

18. A method of providing multicast rate control in a wireless communication device, comprising:
    performing a sounding with a first subset of a plurality of stations in a multicast group;
    receiving feedback from the first subset of the plurality of stations based on the sounding;
    selecting a second subset of the plurality of stations based on the feedback;
    transmitting data frames to the plurality of stations with a first data rate; and
    requesting acknowledgements (ACKs) from only the second subset of the plurality of stations.

19. The method of claim 18, wherein the first data rate is determined based on the feedback of the first subset of the plurality of stations.

20. The method of claim 18, further including:
    determining frame losses with the second subset of the plurality of stations;
    determining an adjusted data rate based on the frame losses with the second subset of the plurality of stations;
    transmitting data frames to the plurality of stations with the adjusted data rate.

21. The method of claim 18, wherein the first subset of the plurality of stations includes all of the plurality of stations.

22. The method of claim 18, wherein the first subset of the plurality of stations includes a random subset of the plurality of stations.

23. The method of claim 18, wherein the first subset of the plurality of stations includes stations with low signal strength (RSSI) in the past.

24. The method of claim 18, wherein the first subset of the plurality of stations is selected based on past sound feedbacks.

25. The method of claim 18, wherein selecting the second subset of the plurality of stations further includes randomly adding at least one station that does not belong to the first subset of the plurality of stations.

26. The method of claim 18, further including:
    until a trigger is detected, repeating:
    requesting ACKS from only the second subset of the plurality of stations;
    determining frame losses with the second subset of the plurality of stations;
    determining an adjusted data rate based on the frame losses with the second subset of the plurality of stations; and
    transmitting data frames to the plurality of stations using the adjusted data rate.

27. A non-transitory, computer-readable medium storing computer-executable instructions for providing multicast rate control in a wireless communication device, the instructions when executed by a processor cause the processor to execute a process comprising:
- transmitting data frames to a plurality of stations in a multicast group with a first data rate;
- requesting acknowledgements (ACKs) from a first subset of the plurality of stations;
- determining frame losses for the first subset of the plurality of stations using the ACKs;
- determining a second data rate based on the frame losses for the first subset of the plurality of stations;
- selecting a second subset of the plurality of stations based on the frame losses for the first subset of the plurality of stations;
- transmitting data frames to the plurality of stations with the second data rate; and
- requesting ACKs only from the second subset of the plurality of stations.

28. The computer-readable medium of claim 27, further including selecting the first subset of the plurality of stations by selecting all of the plurality of stations.

29. The computer-readable medium of claim 27, further including selecting the first subset of the plurality of stations by selecting a random subset of the plurality of stations.

30. The computer-readable medium of claim 27, further including selecting the first subset of the plurality of stations by selecting stations with past low signal strength (RSSI).

31. The computer-readable medium of claim 27, further including selecting the first subset of the plurality of stations by selecting stations based on past sounding feedback.

32. The computer-readable medium of claim 27, wherein determining the second data rate further includes comparing at least one of the frame losses for the first subset of the plurality of stations to a predetermined threshold.

33. The computer-readable medium of claim 27, further including:
- determining frame losses for the second subset of the plurality of stations using the ACKs from the second subset of the plurality of stations;
- adjusting a current data rate based on the frame losses for the second subset of the plurality of stations, the adjusting generating an adjusted data rate; and
- transmitting data frames to the plurality of stations using the adjusted data rate.

34. The computer-readable medium of claim 33, wherein the adjusting includes comparing at least one of the frame losses for the second subset of the plurality of stations to a predetermined threshold.

35. The computer-readable medium of claim 33, further including determining whether a time period has expired after transmitting the data frames to the plurality of stations using the adjusted data rate.

36. The computer-readable medium of claim 35, further including:
- returning to the step of transmitting data frames to the plurality of stations in the multicast group with the first data rate when the time period has expired; and
- returning to the step of requesting ACKs only from the second subset of the plurality of stations when the time period has not expired.

37. The computer-readable medium of claim 27, wherein the first data rate is a lowest data rate.

38. The computer-readable medium of claim 27, wherein the first data rate is a low, but not a lowest data rate.

39. The computer-readable medium of claim 27, wherein determining the frame losses for the first subset of the plurality of stations includes determining packet error rates (PERs).

40. The computer-readable medium of claim 27, wherein selecting the second subset of the plurality of stations includes identifying stations with highest frame losses.

41. The computer-readable medium of claim 27, wherein selecting the second subset of the plurality of stations includes selecting at least two stations with highest frame losses.

42. The computer-readable medium of claim 27, wherein selecting the second subset of the plurality of stations includes selecting a predetermined percentage of the plurality of stations with highest frame losses.

43. The computer-readable medium of claim 27, wherein selecting the second subset of the plurality of stations includes randomly adding at least one station to the first subset of the plurality of stations.

44. A non-transitory, computer-readable medium storing computer-executable instructions for providing multicast rate control in a wireless communication device, the instructions when executed by a processor cause the processor to execute a process comprising:
- performing a sounding with a first subset of a plurality of stations in a multicast group;
- receiving feedback from the first subset of the plurality of stations based on the sounding;
- selecting a second subset of the plurality of stations based on the feedback;
- transmitting data frames to the plurality of stations with a first data rate; and
- requesting acknowledgements (ACKs) from only the second subset of the plurality of stations.

45. The computer-readable medium of claim 44, wherein the first data rate is determined based on the feedback from the first subset of the plurality of stations.

46. The computer-readable medium of claim 44, further including:
- determining frame losses with the second subset of the plurality of stations;
- determining an adjusted data rate based on the frame losses with the second subset of the plurality of stations;
- transmitting data frames to the plurality of stations with the adjusted data rate.

47. The computer-readable medium of claim 44, wherein the first subset of the plurality of stations includes all of the plurality of stations.

48. The computer-readable medium of claim 44, wherein the first subset of the plurality of stations includes a random subset of the plurality of stations.

49. The computer-readable medium of claim 44, wherein the first subset of the plurality of stations includes stations with low signal strength (RSSI) in the past.

50. The computer-readable medium of claim 44, wherein the first subset of the plurality of stations is selected based on past sound feedbacks.

51. The computer-readable medium of claim 44, wherein selecting the second subset of the plurality of stations further includes randomly adding at least one station that does not belong to the first subset of the plurality of stations.

52. The computer-readable medium of claim 44, further including:
- until a trigger is detected, repeating:
  - requesting ACKS from only the second subset of the plurality of stations;
  - determining frame losses with the second subset of the plurality of stations;
  - determining an adjusted data rate based on the frame losses with the second subset of the plurality of stations; and transmitting data frames to the plurality of stations using the adjusted data rate.

53. An electronic device comprising:
a processor block; and
a communication block in operative relation to the processor block, the communication block being configured to provide multicast rate control in the electronic device, the communication block configured to perform a process comprising:
transmitting data frames to a plurality of stations in a multicast group with a first data rate;
requesting acknowledgements (ACKs) from a first subset of the plurality of stations;
determining frame losses for the first subset of the plurality of stations using the ACKs;
determining a second data rate based on the frame losses for the first subset of the plurality of stations;
selecting a second subset of the plurality of stations based on the frame losses for the first subset of the plurality of stations;
transmitting data frames to the plurality of stations with the second data rate; and
requesting ACKs only from the second subset of the plurality of stations.

54. The electronic device of claim 53, further including selecting the first subset of the plurality of stations by selecting all of the plurality of stations.

55. The electronic device of claim 53, further including selecting the first subset of the plurality of stations by selecting a random subset of the plurality of stations.

56. The electronic device of claim 53, further including selecting the first subset of the plurality of stations by selecting stations with past low signal strength (RSSI).

57. The electronic device of claim 53, further including selecting the first subset of the plurality of stations by selecting stations based on past sounding feedback.

58. The electronic device of claim 53, wherein determining the second data rate further includes comparing at least one of the frame losses for the first subset of the plurality of stations to a predetermined threshold.

59. The electronic device of claim 53, further including:
determining frame losses for the second subset of the plurality of stations using the ACKs from the second subset of the plurality of stations;
adjusting a current data rate based on the frame losses for the second subset of the plurality of stations, the adjusting generating an adjusted data rate; and
transmitting data frames to the plurality of stations using the adjusted data rate.

60. The electronic device of claim 59, wherein the adjusting includes comparing at least one of the frame losses for the second subset of the plurality of stations to a predetermined threshold.

61. The electronic device of claim 59, further including determining whether a time period has expired after transmitting the data frames to the plurality of stations using the adjusted data rate.

62. The electronic device of claim 61, further including:
returning to the step of transmitting data frames to the plurality of stations in the multicast group with the first data rate when the time period has expired; and
returning to the step of requesting ACKs only from the second subset of the plurality of stations when the time period has not expired.

63. The electronic device of claim 53, wherein the first data rate is a lowest data rate.

64. The electronic device of claim 53, wherein the first data rate is a low, but not a lowest data rate.

65. The electronic device of claim 53, wherein determining the frame losses for the first subset of the plurality of stations includes determining packet error rates (PERs).

66. The electronic device of claim 53, wherein selecting the second subset of the plurality of stations includes identifying stations with highest frame losses.

67. The electronic device of claim 53, wherein selecting the second subset of the plurality of stations includes selecting at least two stations with highest frame losses.

68. The electronic device of claim 53, wherein selecting the second subset of the plurality of stations includes selecting a predetermined percentage of the plurality of stations with highest frame losses.

69. The electronic device of claim 53, wherein selecting the second subset of the plurality of stations includes randomly adding at least one station to the first subset of the plurality of stations.

70. An electronic device comprising:
a processor block; and
a communication block in operative relation to the processor block, the communication block being configured to provide multicast rate control in the electronic device, the communication block configured to perform steps comprising:
performing a sounding with a first subset of a plurality of stations in a multicast group;
receiving feedback from the first subset of the plurality of stations based on the sounding;
selecting a second subset of the plurality of stations based on the feedback;
transmitting data frames to the plurality of stations with a first data rate; and
requesting acknowledgements (ACKs) from only the second subset of the plurality of stations.

71. The electronic device of claim 70, wherein the communication block is further configured to perform steps including:
determining frame losses with the second subset of the plurality of stations;
determining an adjusted data rate based on the frame losses with the second subset of the plurality of stations;
transmitting data frames to the plurality of stations with the adjusted data rate.

72. The electronic device of claim 71, wherein the communication block is further configured to perform steps including:
until a trigger is detected, repeating:
requesting ACKS from only the second subset of the plurality of stations;
determining frame losses with the second subset of the plurality of stations;
determining the adjusted data rate based on the frame losses with the second subset of the plurality of stations; and
transmitting data frames to the plurality of stations using the adjusted data rate.

73. The electronic device of claim 70, wherein the electronic device is a notebook computer, a desktop computer, a tablet computer, a netbook, a mobile phone, a gaming console, or a personal digital assistant (PDA).

* * * * *